(12) United States Patent
Klausler

(10) Patent No.: US 7,735,088 B1
(45) Date of Patent: Jun. 8, 2010

(54) SCHEDULING SYNCHRONIZATION OF PROGRAMS RUNNING AS STREAMS ON MULTIPLE PROCESSORS

(75) Inventor: Peter M. Klausler, Minneapolis, MN (US)

(73) Assignee: Cray Inc., Seattle, WA (US)

( * ) Notice: Subject to any disclaimer, the term of this patent is extended or adjusted under 35 U.S.C. 154(b) by 988 days.

(21) Appl. No.: 10/643,587

(22) Filed: Aug. 18, 2003

(51) Int. Cl.
G06F 9/46 (2006.01)

(52) U.S. Cl. ....................... 718/108; 718/100

(58) Field of Classification Search ........... 718/100, 718/101, 102, 103, 104, 108, 105, 106; 717/114, 717/131; 709/205, 107; 719/328, 318
See application file for complete search history.

(56) References Cited

U.S. PATENT DOCUMENTS

| | | | |
|---|---|---|---|
| 3,881,701 A | | 5/1975 | Schoenman et al. |
| RE28,577 E | | 10/1975 | Schmidt |
| 4,380,786 A | | 4/1983 | Kelly |
| 4,414,624 A | | 11/1983 | Summer, Jr. et al. |
| 4,541,046 A | | 9/1985 | Nagashima et al. |
| 4,733,348 A | | 3/1988 | Hiraoka et al. |
| 4,771,391 A | | 9/1988 | Blasbalg |
| 4,868,818 A | | 9/1989 | Madan et al. |
| 4,888,679 A | | 12/1989 | Fossum et al. |
| 4,933,933 A | | 6/1990 | Dally et al. |
| 5,008,882 A | | 4/1991 | Peterson et al. |
| 5,012,409 A | * | 4/1991 | Fletcher et al. ............ 718/103 |
| 5,031,211 A | | 7/1991 | Nagai et al. |
| 5,036,459 A | | 7/1991 | Den Haan et al. |
| 5,068,851 A | | 11/1991 | Bruckert et al. |
| 5,072,883 A | | 12/1991 | Vidusek |
| 5,105,424 A | | 4/1992 | Flaig et al. |
| 5,157,692 A | | 10/1992 | Horie et al. |
| 5,161,156 A | | 11/1992 | Baum et al. |
| 5,170,482 A | | 12/1992 | Shu et al. |
| 5,175,733 A | | 12/1992 | Nugent |

(Continued)

FOREIGN PATENT DOCUMENTS

EP 0353819 A2 2/1990

(Continued)

OTHER PUBLICATIONS

Gail et al., Tera Hardware-Software are cooperation, 1997, ACM, pp. 1-16.*

(Continued)

*Primary Examiner*—Meng-Ai An
*Assistant Examiner*—Caroline Arcos
(74) *Attorney, Agent, or Firm*—Schwegman, Lundberg & Woessner, P.A.

(57) ABSTRACT

Systems and methods start a process in an operating system. Additionally, a plurality of program units associated with the process are started. When a context shifting event occurs, each of the plurality of program units has their scheduling synchronized and their context set so that each thread processes the context shifting event. A further aspect of the system is that some program units may be executing on more than one multiple processor unit. In the operating system selects a multiple processor unit to host all of the program units, and migrates those program units that are not currently on the selected multiple processor unit to the selected multiple processor unit.

6 Claims, 3 Drawing Sheets

U.S. PATENT DOCUMENTS

| | | | |
|---|---|---|---|
| 5,197,130 A | 3/1993 | Chen et al. | |
| 5,218,601 A | 6/1993 | Chujo et al. | |
| 5,218,676 A | 6/1993 | Ben-ayed et al. | |
| 5,220,804 A | 6/1993 | Tilton et al. | |
| 5,239,545 A | 8/1993 | Buchholz | |
| 5,276,899 A | 1/1994 | Neches | |
| 5,280,474 A | 1/1994 | Nickolls et al. | |
| 5,297,738 A | 3/1994 | Lehr et al. | |
| 5,311,931 A | 5/1994 | Lee | |
| 5,313,628 A | 5/1994 | Mendelsohn et al. | |
| 5,313,645 A * | 5/1994 | Rolfe | 712/11 |
| 5,331,631 A | 7/1994 | Teraslinna | |
| 5,333,279 A | 7/1994 | Dunning | |
| 5,341,482 A * | 8/1994 | Cutler et al. | 712/244 |
| 5,341,504 A | 8/1994 | Mori et al. | |
| 5,347,450 A | 9/1994 | Nugent | |
| 5,353,283 A | 10/1994 | Tsuchiya | |
| 5,365,228 A | 11/1994 | Childs et al. | |
| 5,375,223 A | 12/1994 | Meyers et al. | |
| 5,418,916 A | 5/1995 | Hall et al. | |
| 5,430,850 A | 7/1995 | Papadopoulos et al. | |
| 5,430,884 A | 7/1995 | Beard et al. | |
| 5,434,995 A | 7/1995 | Oberlin et al. | |
| 5,435,884 A | 7/1995 | Simmons et al. | |
| 5,437,017 A | 7/1995 | Moore et al. | |
| 5,440,547 A | 8/1995 | Easki et al. | |
| 5,446,915 A | 8/1995 | Pierce | |
| 5,456,596 A | 10/1995 | Gourdine | |
| 5,472,143 A | 12/1995 | Bartels et al. | |
| 5,497,480 A | 3/1996 | Hayes et al. | |
| 5,517,497 A | 5/1996 | LeBoudec et al. | |
| 5,530,933 A | 6/1996 | Frink et al. | |
| 5,546,549 A | 8/1996 | Barrett et al. | |
| 5,548,639 A | 8/1996 | Ogura et al. | |
| 5,550,589 A | 8/1996 | Shiojiri et al. | |
| 5,555,542 A | 9/1996 | Ogura et al. | |
| 5,560,029 A | 9/1996 | Papadopoulos et al. | |
| 5,606,696 A | 2/1997 | Ackerman et al. | |
| 5,613,114 A * | 3/1997 | Anderson et al. | 718/108 |
| 5,640,524 A | 6/1997 | Beard et al. | |
| 5,649,141 A | 7/1997 | Yamazaki | |
| 5,721,921 A | 2/1998 | Kessler et al. | |
| 5,740,967 A | 4/1998 | Simmons et al. | |
| 5,765,009 A | 6/1998 | Ishizaka | |
| 5,781,775 A * | 7/1998 | Ueno | 718/102 |
| 5,787,494 A | 7/1998 | Delano et al. | |
| 5,796,980 A | 8/1998 | Bowles | |
| 5,812,844 A * | 9/1998 | Jones et al. | 718/104 |
| 5,825,649 A * | 10/1998 | Yoshimura | 700/82 |
| 5,835,951 A | 11/1998 | McMahan | |
| 5,860,146 A | 1/1999 | Vishin et al. | |
| 5,860,602 A | 1/1999 | Tilton et al. | |
| 5,897,664 A | 4/1999 | Nesheim et al. | |
| 5,946,717 A | 8/1999 | Uchibori | |
| 5,951,882 A | 9/1999 | Simmons et al. | |
| 5,978,830 A * | 11/1999 | Nakaya et al. | 718/102 |
| 5,987,571 A | 11/1999 | Shibata et al. | |
| 5,995,752 A * | 11/1999 | Chao et al. | 717/114 |
| 6,003,123 A | 12/1999 | Carter et al. | |
| 6,014,728 A | 1/2000 | Baror | |
| 6,016,969 A | 1/2000 | Tilton et al. | |
| 6,047,323 A * | 4/2000 | Krause | 709/227 |
| 6,088,701 A | 7/2000 | Whaley et al. | |
| 6,101,590 A | 8/2000 | Hansen | |
| 6,105,113 A | 8/2000 | Schimmel | |
| 6,161,208 A | 12/2000 | Dutton et al. | |
| 6,189,111 B1 * | 2/2001 | Alexander et al. | 714/8 |
| 6,247,169 B1 * | 6/2001 | DeLong | 717/131 |
| 6,269,390 B1 * | 7/2001 | Boland | 718/100 |
| 6,269,391 B1 * | 7/2001 | Gillespie | 718/100 |
| 6,308,250 B1 | 10/2001 | Klausler | |
| 6,308,316 B1 | 10/2001 | Hashimoto et al. | |
| 6,339,813 B1 | 1/2002 | Smith et al. | |
| 6,356,983 B1 | 3/2002 | Parks | |
| 6,366,461 B1 | 4/2002 | Pautsch et al. | |
| 6,389,449 B1 | 5/2002 | Nemirovsky et al. | |
| 6,490,671 B1 | 12/2002 | Frank et al. | |
| 6,496,902 B1 | 12/2002 | Faanes et al. | |
| 6,519,685 B1 | 2/2003 | Chang | |
| 6,553,486 B1 * | 4/2003 | Ansari | 712/222 |
| 6,591,345 B1 | 7/2003 | Seznec | |
| 6,615,322 B2 | 9/2003 | Arimilli et al. | |
| 6,684,305 B1 | 1/2004 | Deneau | |
| 6,782,468 B1 | 8/2004 | Nakazato | |
| 6,816,960 B2 | 11/2004 | Koyanagi | |
| 6,910,213 B1 * | 6/2005 | Hirono et al. | 718/108 |
| 6,922,766 B2 | 7/2005 | Scott | |
| 6,925,547 B2 | 8/2005 | Scott et al. | |
| 6,931,510 B1 | 8/2005 | Damron | |
| 6,952,827 B1 * | 10/2005 | Alverson et al. | 718/104 |
| 6,976,155 B2 | 12/2005 | Drysdale et al. | |
| 7,028,143 B2 | 4/2006 | Barlow et al. | |
| 7,089,557 B2 * | 8/2006 | Lee | 718/102 |
| 7,103,631 B1 * | 9/2006 | van der Veen | 709/205 |
| 7,111,296 B2 * | 9/2006 | Wolrich et al. | 718/102 |
| 7,137,117 B2 * | 11/2006 | Ginsberg | 718/102 |
| 7,143,412 B2 * | 11/2006 | Koenen | 718/102 |
| 7,162,713 B2 * | 1/2007 | Pennello | 717/124 |
| 7,191,444 B2 * | 3/2007 | Alverson et al. | 718/100 |
| 7,503,048 B1 | 3/2009 | Sheets et al. | |
| 7,543,133 B1 | 6/2009 | Scott | |
| 7,577,816 B2 | 8/2009 | Sheets et al. | |
| 2002/0078122 A1 * | 6/2002 | Joy et al. | 709/102 |
| 2002/0091747 A1 * | 7/2002 | Rehg et al. | 709/107 |
| 2002/0169938 A1 | 11/2002 | Scott et al. | |
| 2002/0172199 A1 | 11/2002 | Scott et al. | |
| 2003/0005380 A1 | 1/2003 | Nguyen et al. | |
| 2003/0097531 A1 | 5/2003 | Arimilli et al. | |
| 2004/0019891 A1 * | 1/2004 | Koenen | 718/102 |
| 2004/0044872 A1 | 3/2004 | Scott | |
| 2004/0064816 A1 * | 4/2004 | Alverson et al. | 718/102 |
| 2004/0117793 A1 * | 6/2004 | Shaylor | 718/100 |
| 2004/0162949 A1 | 8/2004 | Scott et al. | |
| 2005/0044128 A1 | 2/2005 | Scott et al. | |
| 2005/0044339 A1 | 2/2005 | Sheets | |
| 2005/0044340 A1 | 2/2005 | Sheets et al. | |
| 2005/0125801 A1 * | 6/2005 | King | 718/108 |

FOREIGN PATENT DOCUMENTS

| | | |
|---|---|---|
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-87/01750 A1 | 3/1987 |
| WO | WO-88/08652 A1 | 11/1988 |
| WO | WO-95/16236 A1 | 6/1995 |
| WO | WO-96/10283 A1 | 4/1996 |
| WO | WO-96/32681 A1 | 10/1996 |

OTHER PUBLICATIONS

"Cray Assembly Language (CAL) for Cray X1™ Systems Reference Manual", *Section 2.6, Memory Ordering*, http://docs.cray.com/books/S-2314-51/index.html,(Jun. 2003), 302 pgs.

"Deadlock-Free Routing Schemes on Multistage Interconnection Networks", *IBM Technical Disclosure Bulletin*, 35, (Dec. 1992), 232-233.

"ECPE 4504: Computer Organization Lecture 12: Computer Arithmetic", The Bradley Department of Electrical Engineering,(Oct. 17, 2000), 12 pgs.

"Msync—Synchronise Memory with Physical Storage", *The Single UNIX® Specification, Version 2: Msync, The Open Group*, http://www.opengroup.org/onlinepubs/007908799/xsh/msync.html,(1997), 3 pgs.

Abts, D., "So Many States, So Little Time: Verifying Memory Coherence in the Cray X1", *Parallel and Distributed Processing Symposium*, (Apr. 22, 2003),11-20.

Adve, V. S., et al., "Performance Analysis of Mesh Interconnection Networks with Deterministic Routing", *Transactions on Parallel and Distributed Systems*, 5(5), (Mar. 1994), 225-246.

Bolding, K., "Non-Uniformities Introduced by Virtual Channel Deadlock Prevention", *Technical Report 92-07-07, Department of Computer Science and Engineering, FR-35 University of Washington*; Seattle, WA 98195, (Jul. 21, 1992), 1-6.

Bolla, R., "A Neural Strategy for Optimal Multiplexing of Circuit and Packet-Switched Traffic", *Proceedings, IEEE Global Telecommunications Conference*, (1992),1324-1330.

Boura, Y. M., et al., "Efficient Fully Adaptive Wormhole Routing in n-dimensional Meshes", *Proceedings, International Conference on Distributed Computing Systems*, (Jun. 1994), 589-596.

Bundy, A. , et al., "Turning Eureka Steps into Calculations in Automatic Program Synthesis", *Proceedings of UK IT 90, (IEE Conf. Pub. 316) (DAI Research Paper 448)*, (1991), 221-226.

Carlile, B. R., "Algorithms and Design: The CRAY APP Shared-Memory System", *COMPCON Spring '93. Digest of Papers.*, (Feb. 22, 1993), 312-320.

Chen, Y., et al., "UTLB: A Mechanism for Address Translation on Network Interfaces", *Proceedings of the Eighth International Conference on Architectural Support for Programming Languages and Operating Systems (ASPLOS)*, (1998), 193-204.

Chien, A. A., et al., "Planar-Adaptive Routing: Low-Cost Adaptive Networks for Multiprocessors", *Proceedings 19th International. Symposium on Computer Architecture*, (May 1992), 268-277.

Cohoon, J. , et al., *C++ Program Design*, McGraw-Hill Companies, Inc., 2nd Edition,(1999), p. 493.

Dally, W. J., et al., "Deadlock-Free Adaptive Routing in Multicomputer Networks Using Virtual Channels", *IEEE Transactions on Parallel and Distributed Systems*, 4(4), (Apr. 1993),466-475.

Dally, W. J., et al., "Deadlock-Free Message Routing in Multiprocessor Interconnection Networks", *IEEE Transactions on Computers, C-36*, (May 1987), 547-553.

Dally, W. J., "Performance Analysis of k-ary n-cube Interconnection Networks", *IEEE Transactions on Computers*, 39(6), (Jun. 1990), 775-785.

Dally, W. J., "Virtual Channel Flow Control", *Proceedings, 17th International Symposium on Computer Architecture*, (May 1990), 60-68.

Duato, J., "A New Theory of Deadlock-Free Adaptive Routing in Wormhole Networks", *IEEE Transactions on Parallel and Distributed Systems*, 4(12), (Dec. 1993), 1320-1331.

Ernst, D. , et al., "Cyclone: A Broadcast-Free Dynamic Instruction Scheduler with Selective Replay", *30th Annual International Symposium on Computer Architecture (ISCA-2003)*, (Jun. 2003),10 pgs.

Gallager, R., "Scale Factors for Distributed Routing Algorithm", *NTC '77 Conference Record*, vol. 2, (1977), 28:2-1-28:2-5.

Gharachorloo, K., "Two Techniques to Enhance the Performance of Memory Consistency Models", *Proceedings of the International Conference on Parallel Processing*, (1991), 1-10.

Glass, C. J., et al., "The Turn Model for Adaptive Routing", *Proceedings, 19th Interanational Symposium on Computer Architecture*, (May 1992),278-287.

Gravano, L , et al., "Adaptive Deadlock- and Livelock-Free Routing with all Minimal Paths in Torus Networks", *IEEE Transactions on Parallel and Distributed Systems*, 5(12), (Dec. 1994), 1233-1251.

Gupta, R., et al., "High Speed Synchronization of Processors Using Fuzzy Barriers", *International Journal of Parallel Programming 19*(1), (Feb. 1990), 53-73.

Ishihata, H., et al., "Architecture of Highly Parallel AP1000 Computer", *Systems and Computers in Japan*, 24(7), (1993), 69-76.

Jesshope, C. R., et al., "High Performance Communications in Processor Networks", *Proc. 16th International Symposium on Computer Architecture*, (May 1989),pp. 150-157.

Kirkpatrick, S. , et al., "Optimization by Simulated Annealing", *Science*, 220(4598), (May 13, 1983), 671-680.

Kontothanassis, L., et al., "VM-based Shared Memory on Low-Latency, Remote-Memory-Access Networks", *Proceedings of the ACM ISCA '97*, (1997), 157-169.

Linder, D. H., et al., "An Adaptive and Fault Tolerant Wormhole Routing Strategy for k-ary n-cubes", *IEEE Transactions on Computers*,40(1), (1991), 2-12.

Lui, Z., et al., "Grouping Virtual Channels for Deadlock-Free Adaptive Wormhole Routing", *5th International Conference, Parallel Architectures and Languages Europe (PARLE '93)*, (Jun. 14-17, 1993),254-265.

Nuth, P., et al., "The J-Machine Network", *Proceedings of the IEEE International Conference on Computer Design on VLSI in Computer & Processors*, (1992), 420-423.

O'Keefe, M. T., et al., "Static Barrier MIMD: Architecture and Performance Analysis", *Journal of Parallel and Distributed Computing*, 25(2), (Mar. 25, 1995), 126-132.

Patterson, D. A., et al., *Computer Architecture: A Quantitative Approach*, 2nd Edition, Morgan Kaufmann Publishers, Inc., San Francisco, CA, (1996), 39-41.

Patterson, D. A., et al., *Computer Architecture: A Quantitative Approach*, 2nd Edition, Morgan Kaufmann Publishers, Inc., San Francisco, CA, (1996), 179-187, 373-384.

Patterson, D. A., et al., *Computer Architecture: A Quantitative Approach*, 2nd Edition, Morgan Kaufmann Publishers, Inc., San Francisco, CA, (1996), 699-708.

Patterson, D. A., et al., *Computer Architecture: A Quantitative Approach* 2nd Edition, Morgan Kaufmann Publishers, Inc., San Francisco, CA, (1996), 194-197.

Scott, S., "Synchronization and Communication in the T3E Multiprocessor", *ASPLOS*, vol. II, (1996), 26-36.

Shumway, M., "Deadlock-Free Packet Networks", *Transputer Research and Applications 2, NATUG-2 Proceedings of the Second Conference of the North American Transputer Users Group*, (Oct. 18-19, 1989),139-177.

Snyder, L. , "Introduction to the Configurable, Highly Parallel Computer", *IEEE Computer 15*(1), (Jan. 1982),47-56.

Talia, D., "Message-Routing Systems for Transputer-Based Multicomputers", *IEEE Micro*, 13(3), (Jun. 1993), 62-72.

Wang, W., et al., "Trunk Congestion Control in Heterogeneous Circuit Switched Networks", *IEEE Transactions on Communications*, 40(7), (Jul. 1992), 1156-1161.

Wood, D. A., et al., "An In-Cache Address Translation Mechanism", *Proceedings of the 13th Annual International Symposium on Computer Architecture*, (1986), 358-365.

Wu, M.-Y., et al., "DO and FORALL: Temporal and Spatial Control Structures", *Proceedings, Third Workshop on Compilers for Parallel Computers, ACPC/TR*, (Jul. 1992), 258-269.

Yang, C. S., et al., "Performance Evaluation of Multicast Wormhole Routing in 2D-Torus Multicomputers", *Proceedings, Fourth International Conference on Computing and Information (ICCI '92)*, (1992), 173-178.

Yantchev, J. , et al., "Adaptive, Low Latency, Deadlock-Free Packet Routing for Networks of Processors", *IEEE Proceedings, 136, Part E*, No. 3, (May 1989), 178-186.

U.S. Appl. No. 10/235,898 Non Final Office Action mailed Jul. 7, 2004, 12 pgs.

U.S. Appl. No. 10/235,898 Notice of Allowance mailed Mar. 15, 2005, 4 pgs.

U.S. Appl. No. 10/235,898 Response filed Jan. 6, 2005 to Non Final Office Action mailed Jul. 7, 2004, 16 pgs.

U.S. Appl. No. 10/643,585, Advisory Action mailed Apr. 2, 2007, 3 pgs.

U.S. Appl. No. 10/643,585, Advisory Action mailed Aug. 14, 2006, 3 pgs.

U.S. Appl. No. 10/643,585, Amendment and Response filed Dec. 4, 2006 to Office Action mailed Oct. 23, 2006, 17 pgs.

U.S. Appl. No. 10/643,585, Amendment and Response filed Mar. 22, 2007 to Final Office Action mailed Jan. 25, 2007, 23 pgs.

U.S. Appl. No. 10/643,585, Amendment and Response filed Mar. 27, 2006 to Non-Final Office Action mailed Sep. 26, 2005, 7 pgs.

U.S. Appl. No. 10/643,585, Amendment and Response filed Aug. 3, 2006 to Final Office Action mailed Apr. 14, 2006, 9 pgs.

U.S. Appl. No. 10/643,585, Final Office Action mailed Jan. 25, 2007, 17 pgs.

U.S. Appl. No. 10/643,585, Final Office Action mailed Apr. 14, 2006, 13 pgs.

U.S. Appl. No. 10/643,585, Non-Final Office Action mailed Oct. 23, 2006, 12 pgs.
U.S. Appl. No. 10/643,585, Non-Final Office Action mailed Sep. 26, 2005, 9 pgs.
U.S. Appl. No. 10/643,585, Notice of Allowance mailed Jun. 11, 2007, 6 pgs.
U.S. Appl. No. 10/643,585, RCE and Amendment and Response filed Apr. 23, 2007 to Final Office Action mailed Jan. 25, 2007 and the Advisory Action mailed Apr. 2, 2007, 15 pgs.
U.S. Appl. No. 10/643,585, Response to Rule 312 Communication mailed Jul. 23, 2007, 2 pgs.
U.S. Appl. No. 10/643,727 Notice of Allowance mailed Jul. 19, 2007, 6 pgs.
U.S. Appl. No. 10/643,742 Non-Final Office Action mailed Apr. 9, 2008, OARN,16 Pgs.
U.S. Appl. No. 10/643,742, Non-Final Office Action mailed Jun. 4, 2007, 13 pgs.
U.S. Appl. No. 10/643,742, Response filed Oct. 11, 2007 to Non-Final Office Action mailed Jun. 4, 2007, 18 pages.
U.S. Appl. No. 10/643,754, Amendment and Response filed Mar. 26, 2008 to Final Office Action mailed Sep. 26, 2007, 12 pages.
U.S. Appl. No. 10/643,754, Final Office Action Mailed Nov. 26, 2007, 29 pgs.
U.S. Appl. No. 10/643,754, Final Office action mailed Sep. 14, 2006, 21 pgs.
U.S. Appl. No. 10/643,754, Non-Final Office Action mailed Feb. 8, 2006, 16 pgs.
U.S. Appl. No. 10/643,754, Non-Final Office Action mailed Jul. 5, 2007, 23 pgs.
U.S. Appl. No. 10/643,754, Response filed Jan. 25, 2008 to Final Office Action mailed Nov. 25, 2007, 20 pgs.
U.S. Appl. No. 10/643,754, Response filed Nov. 7, 2006 to Final Office Action mailed Sep. 14, 2006, 12 pgs.
U.S. Appl. No. 10/643,754, Response filed Mar. 30, 2007 to Advisory Action mailed Nov. 22, 2006, 10 pgs.
U.S. Appl. No. 10/643,754, Response filed Jul. 10, 2006 to Non-Final Office Action mailed Feb. 8, 2006, 12 pgs.
U.S. Appl. No. 10/643,754, Amendment & Response filed Oct. 9, 2007 to Non-final OA mailed Jul. 5, 2007, 14 pgs.
U.S. Appl. 10/643,758 Notice of Allowance mailed Oct. 19, 2007, 4 pgs.
U.S. Appl. No. 10/643,758, Notice of Allowance mailed Jul. 19, 2007, 4 pgs.
U.S. Appl. No. 10/643,758, Amendment and Response filed Jul. 10, 2006 to Final Office Action Mar. 10, 2006, 9 pgs.
U.S. Appl. No. 10/643,758, Final Office Action mailed Feb. 6, 2007, 23 pgs.
U.S. Appl. No. 10/643,758, Final Office Action mailed Mar. 10, 2006, 13 pgs.
U.S. Appl. No. 10/643,758, Non-Final Office Action mailed Aug. 15, 2006, 15 pgs.
U.S. Appl. No. 10/643,758, Non-Final Office Action mailed Aug. 30, 2005, 8 pgs.
U.S. Appl. No. 10/643,758, Response filed Jan. 30, 2006 to Non-Final Office Action mailed Aug. 30, 2005, 9 pgs.
U.S. Appl. No. 10/643,758, Response filed Dec. 14, 2006 to Non-Final Office Action mailed Aug. 15, 2006, 17 pgs.
U.S. Appl. No. 10/643,758, Response filed Apr. 17, 2007 to Final Office Action mailed Feb. 6, 2007, 25 pgs.
U.S. Appl. No. 10/643,769 Response filed Jul. 23, 2007 non-final office action mailed Apr. 23, 2007, 12 pgs.

U.S. Appl. No. 10/643,769, Non-Final Office Action mailed Apr. 23, 2007, 13 pgs.
U.S. Appl. No. 10/643,769, Notice of Allowance mailed Jan. 15, 2008, NOAR,4 pgs.
U.S. Appl. No. 10/643,769, Notice of Allowance Mailed Oct. 29, 2007, 17 pgs.
Handy, J., "The Cache Memory Book", *Academic Press*, (1993), 73-84.
Patterson, D. A., et al., *Computer Architecture a Quantitative Approach*, 2nd Edition, Morgan Kaufmann Publishers, Inc., San Francisco, CA, (1996), 255-260 & 308-317.
"U.S. Appl. No. 10/643,585, Response filed Dec. 15, 2008 to Non-Final Office Action mailed Sep. 15, 2008", 12 pgs.
"U.S. Appl. No. 10/643,742, Response filed Oct. 9, 2008 to Non Final Office Action mailed Apr. 9, 2008", 15 pgs.
"U.S. Appl. No. 10/643,754, Advisory Action mailed Nov. 7, 2008", 2 pgs.
"U.S. Appl. No. 10/643,754, Appeal Brief filed Oct. 27, 2008", 37 pgs.
"U.S. Appl. No. 10/643,754, Response filed Oct. 24, 2008 to Non-Final Office Action mailed Jun. 25, 2008", 10 pgs.
"U.S. Appl. No. 10/643,758, Non Final Office Action mailed Oct. 8, 2008", 12 pgs.
"U.S. Appl. No. 10/643,758, Response filed Jan. 8, 2009 to Non Final Office Action mailed Oct. 8, 2008", 13 pgs.
"U.S. Appl. No. 10/643,769, Notice of Allowance mailed Oct. 29, 2008", 2 pgs.
"U.S. Appl. No. 10/643,742 Final Office Action mailed Dec. 12, 2008.", 7pgs.
"U.S. Appl. No. 10/643,585 Non-Final Office Action Mailed on Sep. 15, 2008", 14 pgs.
"U.S. Appl. No. 10/643,754, Advisory Action mailed Feb. 8, 2008", 3 pgs.
"U.S. Appl. No. 10/643,754, Non-Final Office Action mailed Jun. 25, 2008", 30 pgs.
"U.S. Appl. No. 10/643,758, Advisory Action mailed May 1, 2007", 3 pgs.
"U.S. Appl. No. 10/643,758, Notice of Allowance mailed Jun. 16, 2008", 6 pgs.
"U.S. Appl. No. 10/643,758, Notice of Allowance mailed Jul. 19, 2007", 4 pgs.
"U.S. Appl. No. 10/643,769, Notice of Allowance mailed Jun. 2, 2008", 5 pgs.
"U.S. Appl. No. 10/643,585, Notice of Allowance mailed Jan. 21, 2009", 2 pgs.
"U.S. Appl. No. 10/643,742, Advisory Action mailed Apr. 3, 2009", 3 pgs.
"U.S. Appl. No. 10/643,742, Final Office Action mailed Feb. 23, 2009", 11 pgs.
"U.S. Appl. No. 10/643,742, Response filed Jan. 26, 2009 to Final Office Action mailed Dec. 12, 2008", 14 pgs.
"U.S. Appl. No. 10/643,742, Response filed Jan. 25 2009 to Final Office Action mailed Feb. 23, 2009", 15 pgs.
"U.S. Appl. No. 10/643,758, Notice of Allowance mailed Feb. 27, 2009", 6 pgs.
"U.S. Appl. No. 10/643,742, Non- Final Office Action mailed Jun. 16, 2009", 8 Pgs.
"U.S. Appl. No. 10/643,754, Examiner's Answer mailed Feb. 13, 2009", 35 pgs.

* cited by examiner

SCHEDULING SYNCHRONIZATION OF PROGRAMS RUNNING AS STREAMS ON MULTIPLE PROCESSORS

FIELD

The present invention relates scheduling in computer systems, and more particularly to synchronizing the scheduling of programs running as streams on multiple processors.

RELATED FILES

This application is related to U.S. patent application Ser. No. 10/643,769, entitled "SCHEDULING SYNCHRONIZATION OF PROGRAMS RUNNING AS STREAMS ON MULTIPLE PROCESSORS", filed on even date herewith; U.S. patent application Ser. No. 10/643,744, entitled "Multistream Processing System and Method", filed on even date herewith; to U.S. patent application Ser. No. 10/643,577, entitled "System and Method for Processing Memory Instructions", filed on even date herewith; to U.S. patent application Ser. No. 10/643,742, entitled "Decoupled Store Address and Data in a Multiprocessor System", filed on even date herewith; to U.S. patent application Ser. No. 10/643,586, entitled "Decoupled Scalar/Vector Computer Architecture System and Method (as amended)", filed on even date herewith; to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758 entitled "Remote Translation Mechanism for a Multinode System", filed on even date herewith; and to U.S. patent application Ser. No. 10/643,741, entitled "Multistream Processing Memory-And Barrier-Synchronization Method and Apparatus", filed on even date herewith, each of which is incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Cray, Inc. All Rights Reserved.

BACKGROUND

Through all the changes that have occurred since the beginning of the computer age, there has been one constant, the need for speed. In general, this need has been satisfied in one or both of two methods. The first method involves making the hardware faster. For example, each new generation of hardware, be it processors, disks, memory systems, network systems or bus architectures is typically faster than the preceding generation. Unfortunately, developing faster hardware is expensive, and there are physical limitations to how fast a certain architecture can be made to run.

The second method involves performing tasks simultaneously through parallel processing. In parallel processing, two or more processors execute portions of a software application simultaneously. Parallel processing can be particularly advantageous when a problem can be broken into multiple pieces that have few interdependencies.

While parallel processing has resulted in faster systems, certain problems arise in parallel processing architectures. One problem that arises is that the parallel processors often share resources, and contention for these shared resources must be managed. A second problem is that events affecting the application may occur and one or more of the parallel processes may need to be informed of the event. For example, an exception event may occur when an invalid arithmetic operation occurs. Each parallel processing unit of an application may need to know of the exception.

As a result, there is a need in the art for the present invention.

SUMMARY

The above-mentioned shortcomings, disadvantages and problems are addressed by the present invention, which will be understood by reading and studying the following specification.

One aspect of the system and method is that a process is started in an operating system. Additionally, a plurality of program units associated with the process are started. When a context shifting event occurs, each of the plurality of program units has their scheduling synchronized and their context set so that each thread processes the context shifting event.

A further aspect of the system is that some program units may be executing on more than one multiple processor unit. The operating system selects a multiple processor unit to host all of the program units, and migrates those program units that are not currently on the selected multiple processor unit to the selected multiple processor unit.

The present application describes systems, clients, servers, methods, and computer-readable media of varying scope. In addition to the aspects and advantages of the embodiments of the invention described in this summary, further aspects and advantages of the embodiments of the invention will become apparent by reference to the drawings and by reading the detailed description that follows.

DETAILED DESCRIPTION

Figure 1:
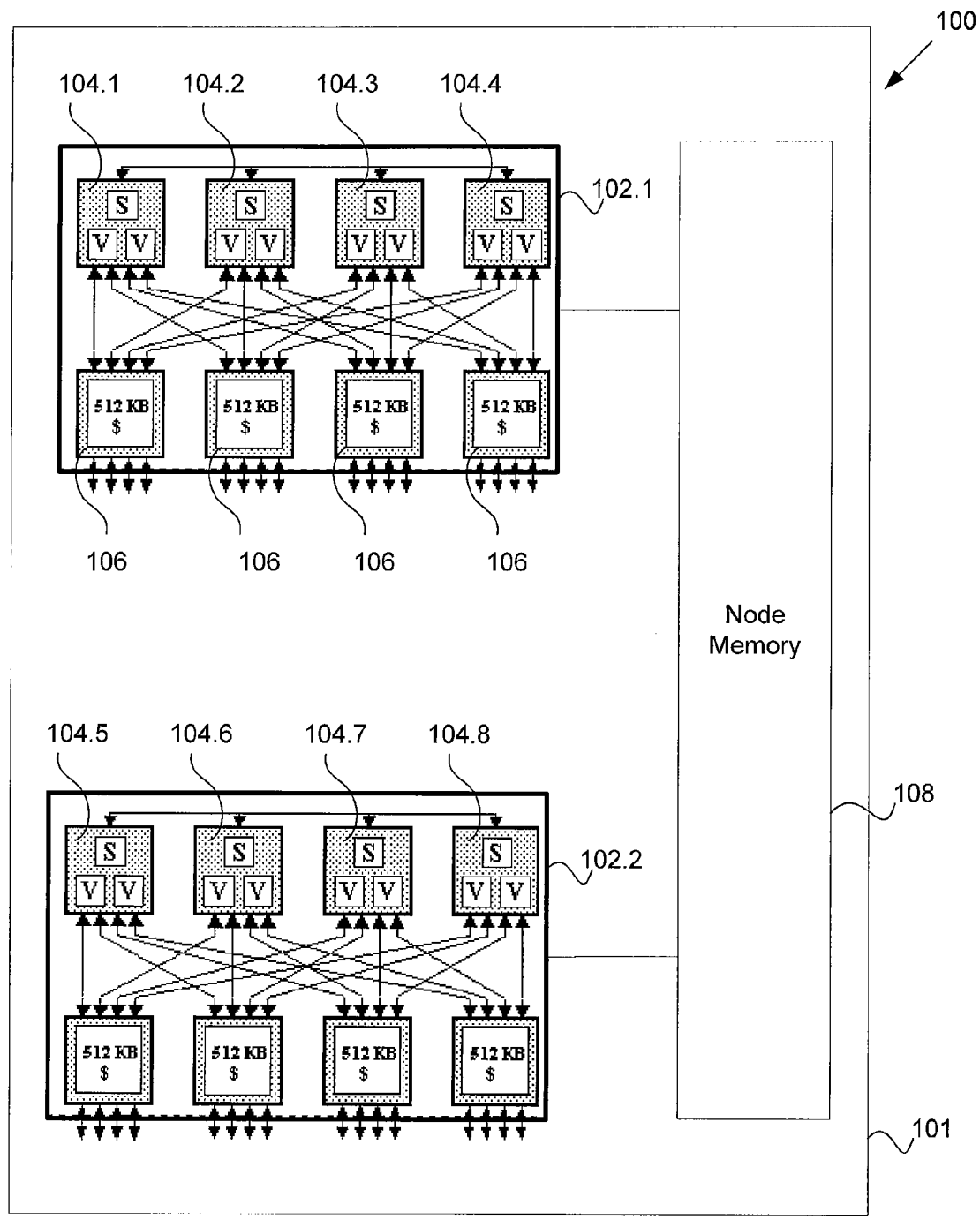
FIG. 1 is a block diagram of parallel processing hardware and operating environment in which different embodiments of the invention can be practiced.

In the following detailed description of exemplary embodiments of the invention, reference is made to the accompanying drawings which form a part hereof, and in which is shown by way of illustration specific exemplary embodiments in which the inventive subject matter may be practiced. These embodiments are described in sufficient detail to enable those skilled in the art to practice the embodiments of the invention, and it is to be understood that other embodiments may be utilized and that logical, mechanical, electrical and other changes may be made without departing from the scope of the present inventive subject matter.

Some portions of the detailed descriptions which follow are presented in terms of algorithms and symbolic representations of operations on data bits within a computer memory.

These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description. Further, the same base reference number (e.g. 102) used in the specification and figures when generically referring to the actions or characteristics of a group of identical components. A numeric index introduced by a decimal point (e.g. 102.1) is used when a specific component among the group of identical components performs an action or has a characteristic.

The following detailed description is, therefore, not to be taken in a limiting sense, and the scope of the present invention is defined only by the appended claims.

Operating Environment

FIG. 1 is a block diagram of parallel processing hardware and operating environment 100 in which different embodiments of the invention can be practiced. In some embodiments, environment 100 comprises a node 101 which includes two or more multiple processor units 102. Although two multiple processor units 102.1 and 102.2 are shown in FIG. 1, it will be appreciated by those of skill in the art that other numbers of multiple processor units may be incorporated in environment 100 and in configurations other than in a node 101. In some embodiments of the invention, node 101 may include up to four multiple processor units 102. Each of the multiple processor units 102 on node 101 has access to node memory 108. In some embodiments, node 101 is a single printed circuit board and node memory 108 comprises daughter cards insertable on the circuit board.

In some embodiments, a multiple processor unit 102 includes four processors 104.1-104.4 and four cache memory controllers 106. Although each multiple processor unit is shown in FIG. 1 as having four processors, those of skill in the art will appreciate that other embodiments of the invention may have more or fewer processors 104. In some embodiments, each processor 104 incorporates scalar processing logic (S) and vector processing logic (V). In some embodiments, each cache memory control 106 may access 512 KB of memory. Each of processor 104 may access any one or more of the cache memory controllers 106.

In one embodiment, the hardware environment is included within the CRAY X1 computer system, which represents the convergence of the CRAY T3E and the traditional Cray parallel vector processors. The X1 is a highly scalable, cache coherent, shared-memory multiprocessor that uses powerful vector processors as its building blocks, and implements a modernized vector instruction set. In these embodiments, multiple processor unit 102 is a Multi-streaming processor (MSP). It is to be noted that FIG. 1 illustrates only one example of a hardware environment, and other environments (for other embodiments) may also be used.

Figure 2:
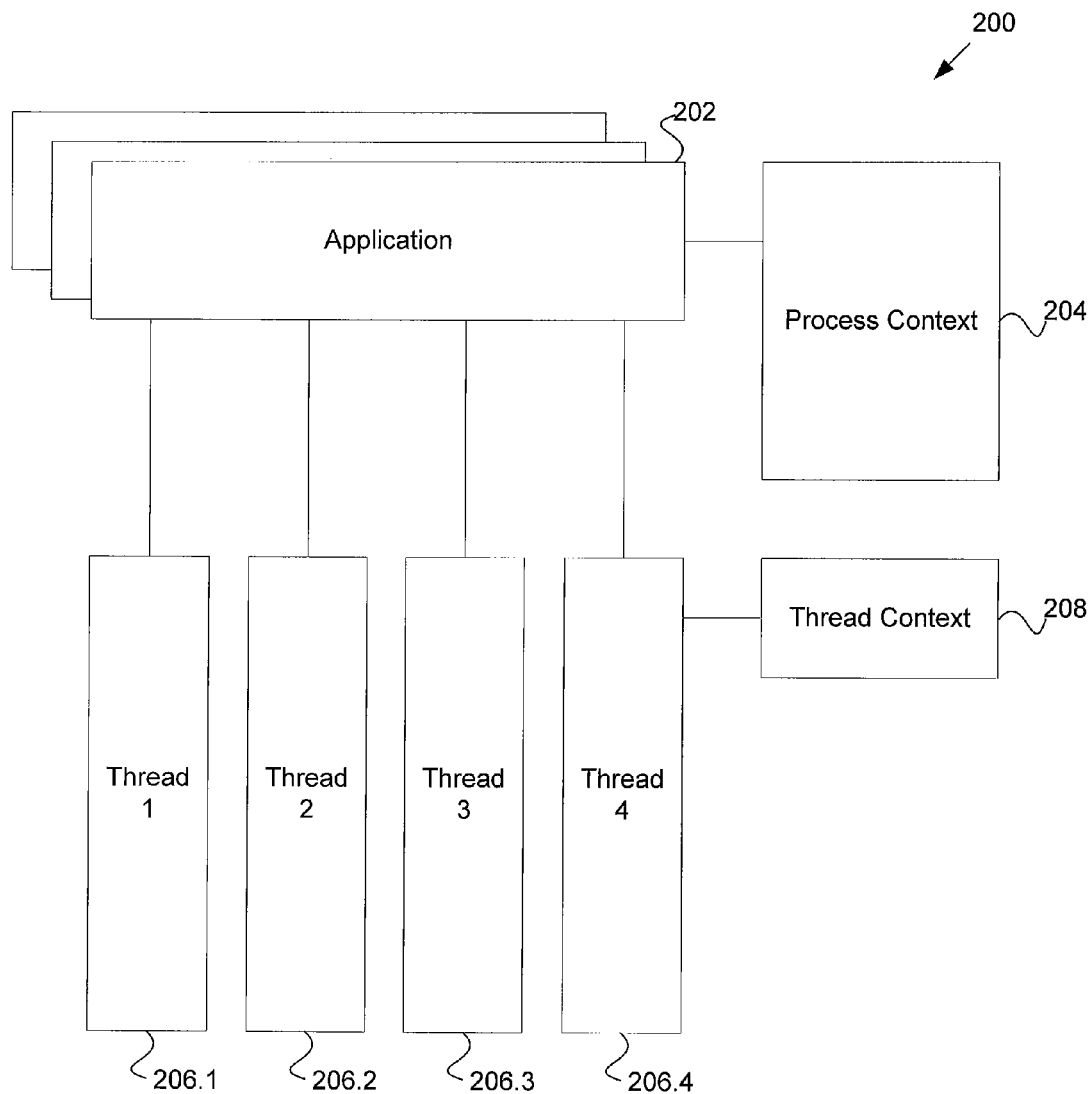
FIG. 2 is a block diagram of a parallel processing software environment according to embodiments of the invention.

FIG. 2 is a block diagram of a parallel processing software environment 200 according to embodiments of the invention. In some embodiments, software environment 200 comprises an operating system that manages the execution of applications 202. Applications may also be referred to as processes. In some embodiments of the invention, the operating system is a UNIX based operating system, such as the UNICOS/mp operating system from Cray Inc. However, the embodiments of the invention are not limited to a particular operating system.

Application 202 may be configured to run as multiple program units. In some embodiments, a program unit comprises a thread 206. Typically, each thread 206 may be executed in parallel. In some embodiments, an application may have up to four threads and the operating environment assigns each thread to be executed on a different processor 104 of multiple processor unit 102. In some embodiments, the threads 206 of an application may be distributed across more than one multiple processor unit 102. For example, two threads 206.1 and 206.2 of an application 202 may be assigned to processors 104.1 and 104.2 respectively while another two threads 206.3 and 206.4 may be assigned to processors 104.7 and 104.8 respectively.

In some embodiments, each application 202 has an application context 204 and each thread 206 has a thread context 208. Application context 204 and thread context 208 are used by the operating environment 200 to manage the state of an application and thread, and may be used to save and restore the application state as the application or thread is moved on or off a processor 104. In some embodiments, application context 204 includes information such as the memory associated with the application, file information regarding open files and other operating system information associated with the application. Thread context 208 includes information such as the register state for the thread, a signal state for the thread and a thread identification. The signal state includes information such as what signals are currently being handled by the thread and what signals are pending for the thread.

Certain events require synchronization among the threads running as part of an application. For example, an event requiring a context shift for the application or thread may occur, and other threads running as part of the application may need to be informed or may need to handle the event.

Figure 3:
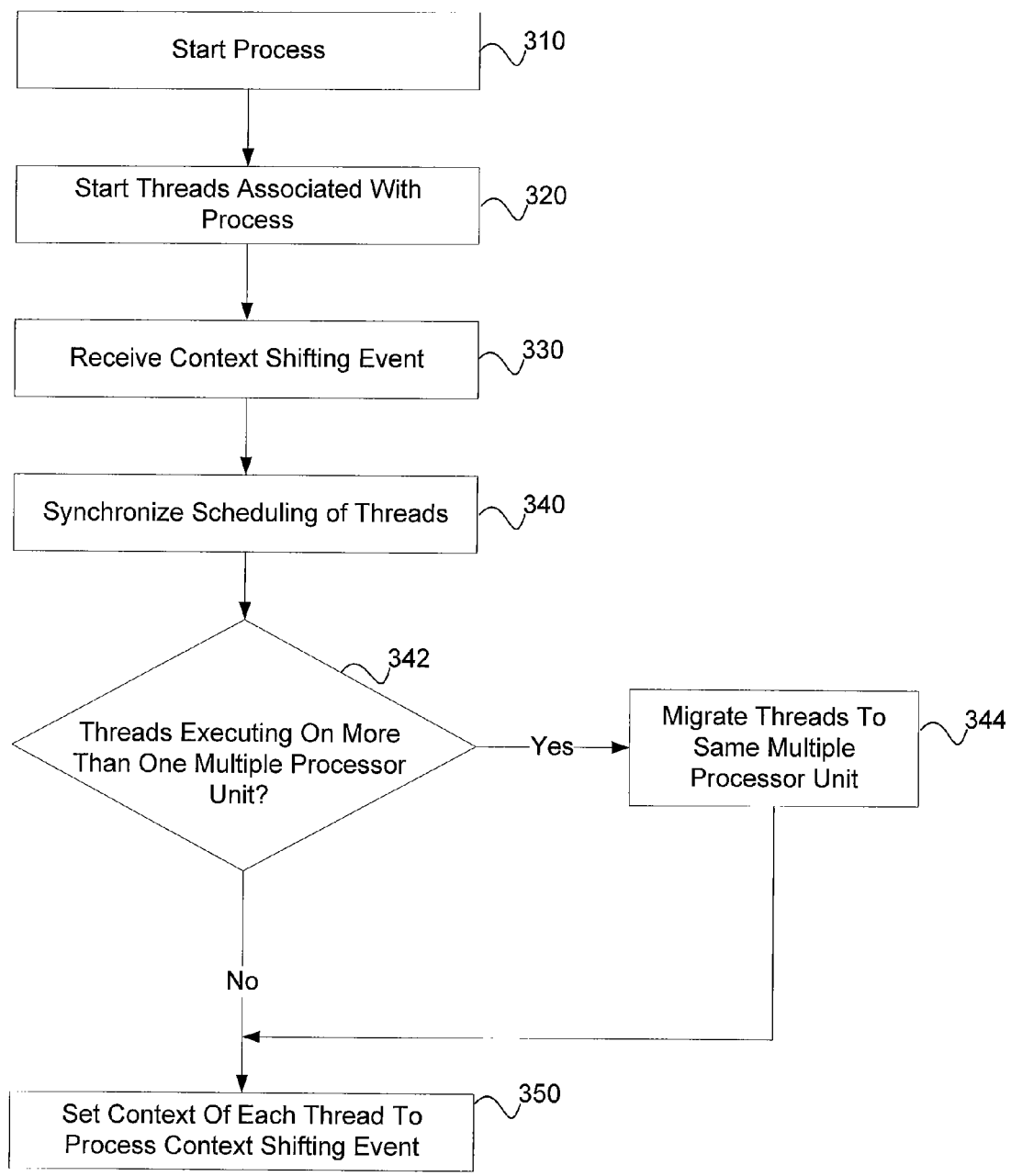
FIG. 3 is a flowchart illustrating a method according to an embodiment of the invention.

FIG. 3 is a flowchart illustrating a method for scheduling multiple threads in a parallel processing environment according to an embodiment of the invention. The method to be performed by the operating environment constitutes computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The method illustrated in FIG. 3 is inclusive of acts that may be taken by an operating environment executing an exemplary embodiment of the invention.

The method begins when an application is started within an operating system (block 310). Typically the application will be scheduled on one of the processors in the system as one of many processes executing within an operating environment.

Next, the application indicates that threads should be started (block 320). The operating system arranges for the threads to be scheduled on one of the available processors. During the execution of one or more of the threads, a context shifting event may occur (block 330). There are multiple reasons for context shift events, the quantity and type of context shifting event will depend on the operating environment.

In some embodiments of the inventions, the context shifting event is a "signal." A signal in UNICOS/mp and other UNIX variations is typically an indication that some type of exceptional event has occurred. Examples of such events include floating point exceptions when an invalid floating point operation is attempted, a memory access exception when a process or thread attempts to access memory that does not exist or is not mapped to the process. Other types of signals are possible and known to those of skill in the art. Additionally, it should be noted that in some operating environments, a signal may be referred to as an exception.

In alternative embodiments, the context shifting event may be a non-local goto. For example, in UNICOS/mp and other UNIX variants, a combination of "setjmp( )" and "longjmp( )" function calls can establish a non-local goto. In essence, the "setjmp" call establishes the location to go to, and the "longjmp" call causes process or thread to branch to the location. The goto is a non-local goto because it causes the execution of the thread or process to continue at a point outside of the scope of the currently executing function. A context shift is required, because the processor registers must be set to reflect the new process or thread execution location.

In further alternative embodiments, the context shifting event may be a system call. Typically a system call requires that the process or thread enter a privileged mode in order to execute the system call. In UNICOS/mp and UNIX variants, the system call must typically execute in kernel mode, while normally a process or thread executes in user mode. In order to execute in kernel mode, a context shift is required.

Those of skill in the art will appreciate that other context shifting events are possible and within the scope of the inventive subject matter.

Upon receiving indication of a context shifting event, the operating environment must synchronize the state of the threads associated with the application (block 340) In some embodiments of the invention, this synchronization may be performed by a "gsync" instruction. The operation of the gsync instruction is described in detail in U.S. patent application Ser. No. 10/643,577 entitled "System and Method for Processing Memory Instructions" which has been previously incorporated by reference.

Additionally, in some embodiments, the operating system determines if each of the threads are operating on the same multiple processor unit 102. In these embodiments, the system will select a multiple processor unit 102 that is to manage all of the threads, and swaps out threads that are executing on the selected multiple processor unit 102 that do not belong to the application associated with the context shifting event.

The operating environment then migrates threads associated with the application that are currently not on the selected multiple processor unit 102 to the selected multiple processor unit (block 344). This is desirable because often the threads will be executing code located in the memory of the selected multiple processor unit. For example, in the case of a signal, the threads will each execute the same signal handling code established for the signal.

Next, each thread's context is set so that it executes in the new context (block 350). For example, in the case of a signal, the new context will be the signal handler code. In the case of a system call, the new context will typically be code executed in kernel mode.

As each thread executes in the new context, local synchronization may be required, for example when a thread leaves a system call or when one thread requires results calculated by another thread. In some embodiments of the invention, an "msync" instruction may be used to synchronize the execution of the threads. The operation of the msync instruction is described in detail in U.S. patent application Ser. No. 10/643,577 entitled "System and Method for Processing Memory Instructions" which has been previously incorporated by reference.

CONCLUSION

Systems and methods for scheduling threads in a parallel processing environment have been disclosed. The systems and methods described provide advantages over previous systems. The threads associated with a process and executing in parallel may be conveniently scheduled so that they all process a context shifting event.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A method for scheduling a plurality of program units, the method comprising:

starting a process within an operating system executing in a system having a plurality of multiple processor units, each of the multiple processor units having a plurality of processors;

starting the plurality of program units within the operating system, the plurality of program units associated with the process, wherein the plurality of program units execute on two or more of the plurality of multiple processor units; and upon the occurrence of a context shifting event for a first program unit of the plurality of program units, performing the tasks of:

migrating each of one or more of the plurality of program units that are not executing on a selected multiple processor unit of the plurality of multiple processing units to the selected multiple processor unit, synchronizing the scheduling of each of the plurality of program units, setting the context shifting event in a context of each of the plurality of program units to the same context shifting event as the first program unit, and processing by each of the plurality of program units the same context shifting event;

wherein the context shifting event comprises an exception, a non-local goto, a signal or a system call.

2. The method of claim 1, wherein the program unit comprises a thread.

3. A system for scheduling a plurality of program units, the system comprising:
  a plurality of multiple processor units, each multiple processor unit having a plurality of processors, wherein each of the plurality of processors on a multiple processor unit shares cache memory;
  a memory coupled to the plurality of multiple processor units; and
  an operating environment stored in the memory and executed by at least one of the processors wherein at least one of the processors performs the tasks of:
    start a process,
    start the plurality of program units within an operating system, the plurality of program units associated with the process, wherein the plurality of program units execute on two or more of the plurality of multiple processor units,
    upon the occurrence of a context shifting event for a first program unit of the plurality of program units, at least one of the processors performs the tasks of:
      migrate each of one or more of the plurality of program units that are not executing on a selected multiple processor unit of the plurality of multiple processing units to the selected multiple processor unit,
      synchronize the scheduling of each of the plurality of program units, and
      set the context shifting event in a context of each of the plurality of program units to the same context shifting event as the first program unit,
    wherein each of the plurality of program units process the same context shifting event;

wherein the context shifting event comprises an exception, a non-local goto, a signal or a system call.

4. The system of claim 3, wherein the program unit comprises a thread.

5. A computer storage medium having stored thereon computer-executable instructions that when executed by one or more processors perform a method for scheduling a plurality of program units, the method comprising:
  starting a process within an operating system executing in a system having a plurality of multiple processor units, each of the multiple processor units having a plurality of processors;
  starting the plurality of program units within the operating system, the plurality of program units associated with the process, wherein the plurality of program units execute on two or more of the plurality of multiple processor units; and
  upon the occurrence of a context shifting event for a first program unit of the plurality of program units, performing the tasks of:
    migrating each of one or more of the plurality of program units that are not executing on a selected multiple processor unit of the plurality of multiple processing units to the selected multiple processor unit,
    synchronizing the scheduling of each of the plurality of program units, and
    setting the context shifting event in a context of each of the plurality of program units to the same context shifting event as the first program unit, and
  processing by each of the plurality of program units the same context shifting event;
  wherein the context shifting event comprises an exception, a non-local goto, a signal or a system call.

6. The computer storage medium of claim 5, wherein the program unit comprises a thread.

* * * * *

UNITED STATES PATENT AND TRADEMARK OFFICE
CERTIFICATE OF CORRECTION

PATENT NO. : 7,735,088 B1 Page 1 of 1
APPLICATION NO. : 10/643587
DATED : June 8, 2010
INVENTOR(S) : Peter M. Klausler et al.

It is certified that error appears in the above-identified patent and that said Letters Patent is hereby corrected as shown below:

Title Page, Item (56)
On page 4, in column 2, under "Other Publications", line 52, delete "Jan." and insert -- Mar. --, therefor.

Signed and Sealed this

Thirty-first Day of August, 2010

David J. Kappos
*Director of the United States Patent and Trademark Office*